United States Patent
Kim et al.

(10) Patent No.: US 7,411,577 B2
(45) Date of Patent: Aug. 12, 2008

(54) MOBILE DISPLAY DEVICE, MOBILE DISPLAY SYSTEM AND IMAGE SIGNAL REPRODUCING METHOD THEREOF

(75) Inventors: Yong-jae Kim, Suwon-si (KR); Yong-jai Lee, Suwon-si (KR); Jong-jin Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 10/897,123

(22) Filed: Jul. 23, 2004

(65) Prior Publication Data

US 2005/0020319 A1    Jan. 27, 2005

(30) Foreign Application Priority Data

Jul. 25, 2003    (KR) ............... 10-2003-0051666

(51) Int. Cl.
*G09G 5/00* (2006.01)
(52) U.S. Cl. ....................... 345/156; 345/2.3
(58) Field of Classification Search ........... 345/2.1–2.3, 345/156–178
See application file for complete search history.

(56) References Cited

U.S. PATENT DOCUMENTS

| | | | | |
|---|---|---|---|---|
| 5,579,528 A | * | 11/1996 | Register | 710/303 |
| 5,859,628 A | * | 1/1999 | Ross et al. | 345/173 |
| 5,983,073 A | * | 11/1999 | Ditzik | 455/11.1 |
| 6,035,350 A | * | 3/2000 | Swamy et al. | 710/73 |
| 6,067,076 A | * | 5/2000 | Hocker et al. | 345/158 |
| 6,317,061 B1 | * | 11/2001 | Batra et al. | 341/22 |
| 6,539,358 B1 | * | 3/2003 | Coon et al. | 704/275 |
| 6,580,422 B1 | * | 6/2003 | Reilly | 345/169 |
| 6,897,833 B1 | * | 5/2005 | Robinson et al. | 345/2.3 |
| 7,023,427 B2 | * | 4/2006 | Kraus et al. | 345/173 |
| 7,047,039 B2 | * | 5/2006 | Lalley | 455/556.2 |
| 2002/0109665 A1 | * | 8/2002 | Matthews et al. | 345/156 |

FOREIGN PATENT DOCUMENTS

| | | |
|---|---|---|
| JP | 11-143598 A | 5/1999 |
| JP | 2000-39983 A | 2/2000 |
| JP | 2002-304283 A | 10/2002 |
| JP | 2002-312155 A | 10/2002 |
| KR | 2000-0011182 U | 6/2000 |

* cited by examiner

*Primary Examiner*—Richard Hjerpe
*Assistant Examiner*—Mahmoud Fatahi Yar
(74) *Attorney, Agent, or Firm*—Sughrue Mion, PLLC

(57) ABSTRACT

A mobile display device capable of communicating with a host computer depending upon whether it is coupled with a docking station. The mobile display device includes a wired module for receiving the wired input signal applied from the docking station and converting the wired input signal into a first video signal; a wireless module for converting the wired or wireless input signal applied from the host computer into a second video signal; a display panel for reproducing the first video signal and the second video signal; and a display controller for converting the first and second video signals applied to the display panel from the wired module and the wireless module depending upon whether the mobile display device is coupled with the docking station, and applying to the display panel a control signal for turning on and off images reproduced from the display panel upon the above-described conversions.

8 Claims, 6 Drawing Sheets

MOBILE DISPLAY DEVICE, MOBILE DISPLAY SYSTEM AND IMAGE SIGNAL REPRODUCING METHOD THEREOF

CROSS-REFERENCE TO RELATED APPLICATION

This application claims the benefit of Korean Patent Application No. 2003-51666, dated Jul. 25, 2003, in the Korean Intellectual Property Office, the disclosure of which is incorporated herein by reference.

BACKGROUND OF THE INVENTION

1. Field of the Invention

The present invention relates to a mobile display device and a mobile display system, and more particularly, to a mobile display device and a mobile display system capable of minimizing noise and electric power consumption which occur upon view switchovers in the mobile display device, and an image signal reproducing method of the mobile display device.

2. Description of the Related Art

In general, a computer system is provided with a display device, an input device, a processor, a memory, and a storage part for storing programs or Operating Systems. In such a computer system, a user has difficulties in doing his or her jobs when using the computer system beyond a certain distance. The user with a mobile notebook or a laptop computer undergoes the same difficulties, so the user has to stay close to a computer system connected with a display device all the time even when he or she surfs the web or watches moving pictures. As for such a problem, Microsoft Corporation has provided a smart display device which is a mobile display device receiving and sending video data in a wired or a wireless manner with a computer system.

FIG. 1 is a block diagram for conceptually showing a conventional mobile display system.

The mobile display system shown in FIG. 1 has a host computer 10 for outputting wired and wireless video signals, a docking station 20 for receiving and sending data in a wired manner with the host computer 10, and a mobile display device 30 detachably mounted to the docking station 20, for receiving a wireless video signal outputted from the host computer 10. The mobile display device 30 operates in a fashion similar to a display device provided for a general computer system, when mounted on the docking station 20. Meanwhile, the mobile display device 30 performs wireless communications with the host computer 10 when the mobile display device 30 is released from the docking station 20. The wireless communications are performed according to a communication code such as 802.11b, and the mobile display device 30 receives a wireless video signal sent from the host computer 10 and reproduces the video signal on a screen. At this time, if the mobile display device 30 is provided with a touch panel, a command can be simply executed through the touch panel, and, when the mobile display device 30 is used to surf the web, a user can use the mobile display device, carrying it with him or her, in a distance range in which communications are available with the host computer 10.

FIG. 2 is a block diagram for showing a conventional mobile display device 30.

The mobile display device shown in FIG. 2 has a wireless module 31, a wired module 32, a docking detector 33, a switching part 34, a switching controller 35, and a display panel 36.

The wireless module 31 receives a wireless input signal applied from the host computer 10, and decodes and converts the wireless input signal into video signal data2. Further, the wireless module 31 applies a control signal ctr2 to the display panel 36 through the switching part 34 to enable the display panel 36 when a video signal is sent to the display panel 36.

The wired module 32 receives a wired input signal applied from the host computer 10 when the mobile display part 30 is coupled with the docking station 20 shown in FIG. 1, decodes and converts the wired input signal into a video signal data1. The converted wired input signal data1 is applied to the display panel 36 for reproduction, and, like the wireless module 31, when the wired module 32 applies the video signal data1 to the display panel 36, the control signal ctr1 is also applied to the display panel 36 to enable the display panel 36.

The docking detector 33 detects whether the mobile display device 30 and the docking station 20 are coupled.

The switching part 34 selectively applies to the display panel 36 the video signals data1 and data2 and the control signals ctr1 and ctr2 respectively outputted from the wireless module 31 and the wired module 32 depending upon a result of the detection of the docking detector 33. For example, if the mobile display part 30 and the docking station 20 are coupled with each other as determined by the docking detector 33, the switching part 34 passes only the video signal data1 and the control signal ctr1 which are applied to the display panel 36 from the wired module 32, and, if the mobile display part 30 and the docking station 20 are released from each other, the switching part 34 passes only the video signal data2 and the control signal ctr1 which are applied to the display panel 36 from the wireless module 31.

The switching controller 35 applies to the wired module 32 and the wireless module 31 information on whether the docking station 20 and the mobile display part 30 are coupled with each other or released from each other, to thereby have the wired module 32 and the wireless module 31 share information for turning on or off the display panel 36. For example, if the docking station 20 and the mobile display device 30 are released from each other while the wired module 32 applies the video signal data1 to the display panel 36, the switching controller 35 receives the release state from the docking detector 33, notifies the wired module 32 of the release state, and enables the wireless module 31. Accordingly, the wired module 32 stops sending the video signal data1 to the display panel 36, and sends the control signal ctr1 to turn off the display panel 36. If the control signal ctr1 is completely sent from the wired module 32 to the display panel 36, the wired module 32 notifies the switching controller 35 of the complete transmission, and the switching controller 35 instructs the wireless module 31 to send the video signal data2 after the switching controller 35 is notified. The wireless module 31 applies the video signal data1 to the display panel 36 through the switching part 34 in response to the instruction of the switching controller 35, and also applies the control signal ctr2 to turn on the display panel 36. At this time, the switching controller 35 enables the switching part 34 to pass signals between the wireless module 31 and the display panel 36.

As stated above, the conventional mobile display device 30 has to have the switching controller 35 recognize the states of the wired module 32 and the wireless module 31 all the time. That is, at the time when the wireless module 31 applies the video signal data2 to the display panel 36, the wired module 32 applies the control signal ctr1 to the display panel 36 to stop sending a video signal to the display panel 36, and notifies the wireless module 31 through the switching controller 35 of whether the application of the control signal ctr1 is completed, and, at the time when the wired module 32 is to apply the video signal to the display panel 36, the wireless module 31 applies the control signal ctr2 to stop sending the video signal data2 to the display panel 36, and notifies the wired module 32 of whether the application of the control signal ctr2 is completed. Accordingly, the wired module 32 and the wireless module 31 have to share information to recognize each other's states all the time, which increases the complexity of the mobile display device 30 and error possibility upon implementing the information sharing in hardware and software.

In general, the wireless module 31 includes a module (not shown) for communicating with the host computer 10 in the wireless manner, a decoding module (not shown) for decoding a received wireless input signal and producing a video signal, input/output ports (not shown) for recognizing the state of the wired module 32 through the switching controller 35, a processor (not shown) for controlling the above modules and ports, and a memory (not shown), and the wireless module 31 is driven by a built-in operating system such as Windows CE. Accordingly, in order for the wireless module 31 to keep recognizing the states of the wired module 32 through the switching controller 35, the wireless module 31 frequently receives an interrupt signal (not shown) corresponding to a time point at which the wired module 32 is turned on or off, and an interrupt signal (not shown) corresponding to a state of the wired module 32, which increases malfunction possibility in the wireless module 31. Further, since the video signal data2 of the wireless module 31 is applied to the display panel 36 after the video signal data1 applied to the display panel 36 from the wired module 32 is cut off and the wireless module 31 checks the cut-off of the video signal data1, switching noise occurs upon view switchovers of the wired module 32 and wireless module 31. The switching noise renders the screen gray since no video signal is applied to the display panel 36 for a certain period of time, and the switching noise mainly occurs when the video signals data1 and data2 outputted from the wireless module 31 and the wired module 32 are added in the display panel 36. Further, the mobile display part 30 is provided with all the wired module 32 and the wireless module 31, which causes a problem that the mobile display part 30 consumes unnecessary electric power in the wired module 32 when the mobile display part 30 is driven through the wireless module 31.

SUMMARY OF THE INVENTION

The present invention has been devised to solve the above problem, so it is an aspect of the present invention to provide a mobile display device and a system capable of minimizing noise and electric power consumption which occur upon screen changes in a mobile display device.

In order to achieve the above aspect, a mobile display device capable of communicating with a host computer in wired and wireless manners depending upon whether the mobile display device is coupled with a docking station that is supplied with a wireless input signal from the host computer, according to the present invention, comprises a wired module for receiving the wired input signal applied from the docking station and converting the wired input signal into a first video signal when the mobile display device is coupled with the docking station; a wireless module for converting a wireless input signal applied from the host computer into a second video signal when the mobile display device is released from the docking station; a display panel for reproducing the first video signal and the second video signal; and a display controller for converting with a predetermined time margin the first and second video signals applied to the display panel from the wired module and the wireless module depending upon whether the mobile display device is coupled with the docking station, and applying to the display panel a control signal for turning on and off images reproduced from the display panel upon the conversions.

Preferably, the display controller includes a control signal generator for generating in predefined patterns the control signal for turning the display device on and off; and a timing controller for controlling the control signal generator to apply the control signal to the display device, depending upon whether the docking station is coupled to the display device, and turning the control signal generator on and off in consideration of a time point at which any of the first and second video signals is applied to the display panel.

Preferably, the display device further comprises a touch panel for producing a signal corresponding to external pressure.

It is preferable that the wireless module applies the signal of the touch panel to the host computer.

In order to achieve the above object, a mobile display system according to the present invention comprises a host computer enabling wired and wireless communications; a docking station provided with a wired module for receiving a wired input signal from the host computer and converting the wired signal into a first video signal; and a mobile display device for converting a wireless input signal applied from the host computer into a second video signal, and reproducing any of the first and second video signal depending upon whether the mobile display device is coupled with the docking station.

Preferably, the mobile display device includes a display panel for reproducing the first and second video signals; coupling connectors provided to be coupled with the docking station; a wireless module for converting the wireless input signal into the first video signal; a switching part for selecting and applying any of the first and second video signals to the display panel; and a display controller for controlling the switching part depending upon the coupled state of the coupling connectors, and applying any of the first and second video signals to the display panel.

Preferably, the docking station further includes a power supply for rectifying and supplying a normal voltage to the wired module.

Preferably, the display controller includes a control signal generator for generating in predefined patterns a control signal for turning the display panel on and off; and a timing controller for controlling the control signal generator to apply the control signal to the display panel depending upon the coupled state of the coupling connectors, and turning the control signal generator on and off in consideration of a time point at which any of the first and second video signals are applied to the display panel.

Preferably, the mobile display device further includes a touch panel provided on the display panel and for generating a signal corresponding to external pressure.

Preferably, the wireless module applies to the host computer the signal generated from the touch panel.

The above aspect is also achieved by providing an image signal reproducing method of a mobile display device capable of communicating with a host computer in wired and wireless manners depending upon whether the mobile display device is coupled with a docking station supplied with a wired input signal from the host computer. The method comprises the steps of performing selectively a wired communication and a wireless communication depending on whether the mobile display device is coupled with the docking station, and converting the wired communication to the wireless communication, and vice versa, with a predetermined time margin according to the docking state of the mobile display device to the docking station.

When the wired communication is converted to the wireless communication, and vice versa, a video signal is received and reproduced according to the previous communication for a predetermined time.

Hereinafter, the present invention will be described in detail with reference to the accompanying drawings.

BRIEF DESCRIPTION OF THE DRAWINGS

The invention will be described in detail with reference to the following drawings in which like reference numerals refer to like elements, and wherein.

DETAILED DESCRIPTION OF EXEMPLARY EMBODIMENTS

Figure 1:
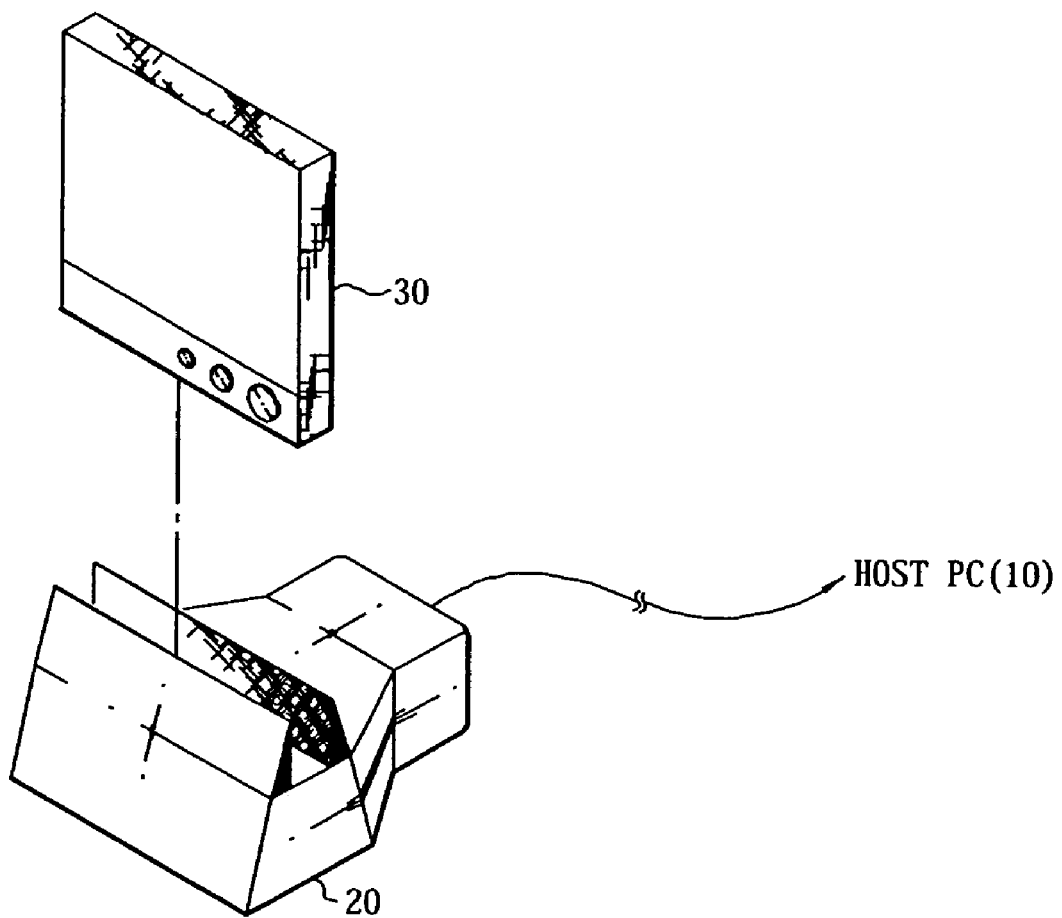
FIG. 1 is a block diagram for showing a general mobile display system.
Figure 2:
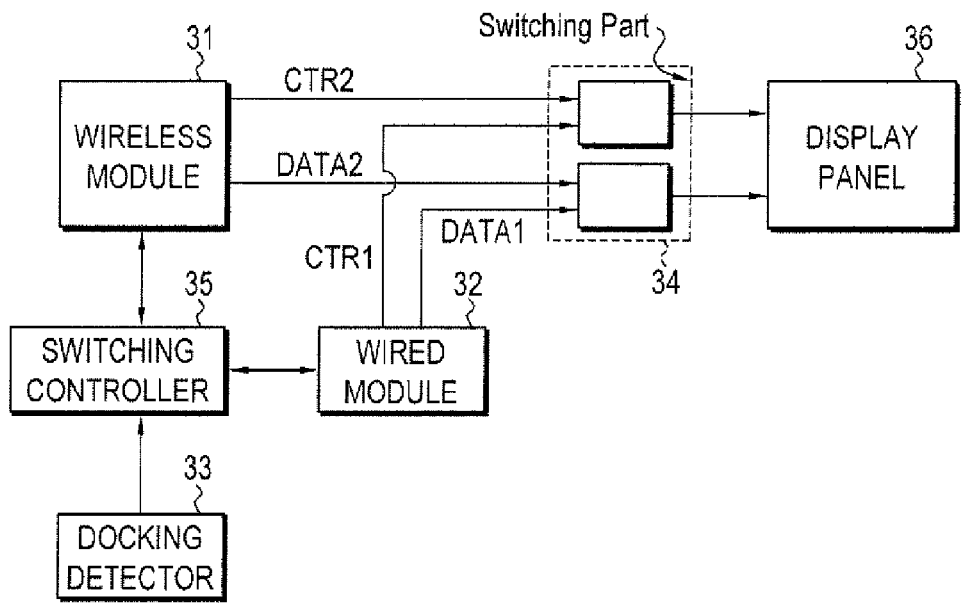
FIG. 2 is a block diagram for showing a conventional mobile display device.
Figure 3:
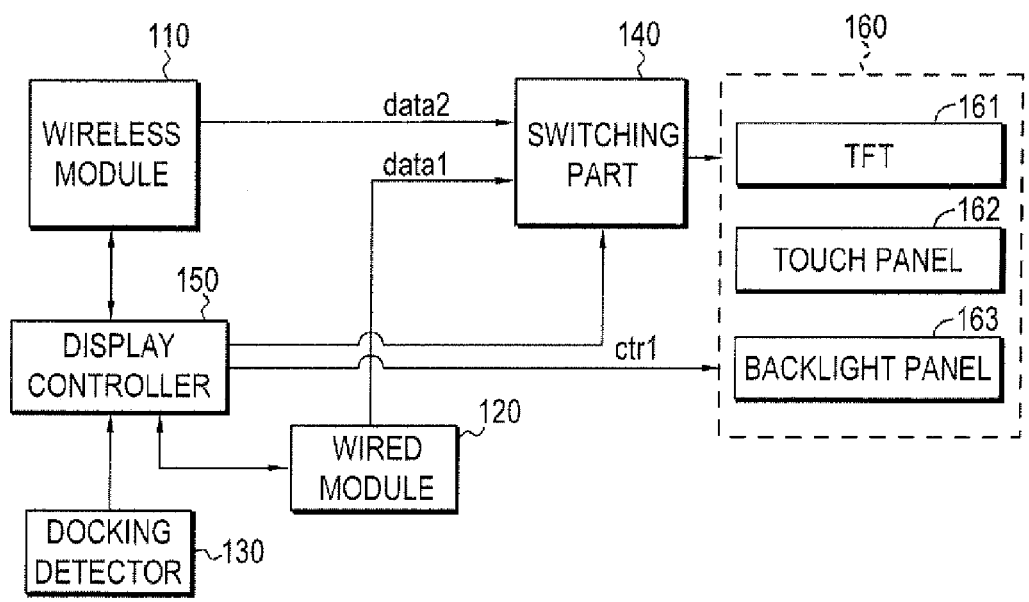
FIG. 3 is a block diagram for showing a mobile display device according to an embodiment of the present invention.

FIG. 3 is a block diagram for showing a mobile display device according to an embodiment of the present invention. Hereinafter, the present invention will be described together with FIG. 1, of which descriptions have been made.

The mobile display device 30 shown in FIG. 3 has a wireless module 110, a wired module 120, a docking detector 130, a switching part 140, a display controller 150, and a display panel 160.

The wireless module 110 receives and decodes a wireless input signal applied from the host computer 10, and converts the decoded wireless input signal into a video signal. If the mobile display device 30 is coupled with the docking station 20 shown in FIG. 1, the wired module 120 receives and decodes a wired input signal applied from the host computer 10, and converts the decoded wired input signal into a video signal. The docking detector 130 detects whether the mobile display device 30 is coupled with the docking station 20.

According to a result of the detection of the docking detector 130, the switching part 140 selectively applies to the display panel 160, via the switching part 140, the video signals data1 and data2 outputted from the wireless module 110 and the wired module 120. For example, if the mobile display device 30 is coupled with the docking station 20 as a result of the detection of the docking detector 130, the switching part 140 passes only the video signal data1 applied to the display panel 160 from the wired module 120, and, if the mobile display device 30 is released from the docking station 20, the switching part 140 passes only the video signal data2 applied from the wireless module 110 to the display panel 160.

According to a result of the detection of the docking detector 130, the display controller 150 applies the control signal ctrl to the display panel 160 to turn on and off the display panel 160. Further, according to a result of the detection of the docking detector 130, the display controller 150 controls the switching part 140 to apply to the display panel 160 any of the video signals data1 and data2 applied to the switching part 140 from the wireless module 110 and the wired module 120. For example, if the mobile display device 30 is coupled with the docking station 20, the video signal data1 outputted from the wired module 120 is selected from the switching part 140 controlled by the display controller 150, and applied to the display panel 160, and, if the mobile display device 30 is released from the docking station 20, the video signal data2 is selected by the switching part 130 and applied to the display panel 160. Meanwhile, the display controller 150 sets, as a time point at which images reproduced on the display panel 160 are not disconnected, a time point at which the video signals data2 and data1 are switched by the switching part 140, wherein the video signals data2 and data1 are respectively outputted from the wired module 120 and the wireless module 110.

For example, when the mobile display device 30 is coupled with the docking station 20 and subsequently released therefrom, the display controller 150 does not immediately cut off through the switching part 140 the video signal data1 applied to the display panel 160 from the wired module 120, but controls the switching part 140 in consideration of the time at which the video signal data2 applied to the switching part 140 from the wireless module 110 arrives. Accordingly, when the video signal data1 and data2, which are applied to the switching part 140 from the wired module 120 and the wireless module 110, are switched, no switching noise occurs. Further, since the control signal ctrl for turning on and off the display panel 160 is directly applied to the display panel 160 from the display controller 150, the wireless module 110 and the wired module 120 do not have to perform data communications therebetween to recognize each other's states. That is, the control signal ctrl for turning on and off the display panel 160 is generated from display controller 150 alone.

The display panel 160 has a thin-film transistor (TFT) panel 161, a touch panel 162, and a back-light panel 163.

The TFT panel 161 reproduces a video signal applied from the switching part 140. The touch panel 162 is provided on the TFT panel 161, and generates a signal (not shown) corresponding to a position at which a user applies pressure. The backlight panel 163 is disposed on the back of the TFT panel 161, and provides a light source the TFT panel 161 needs.

Figure 4:
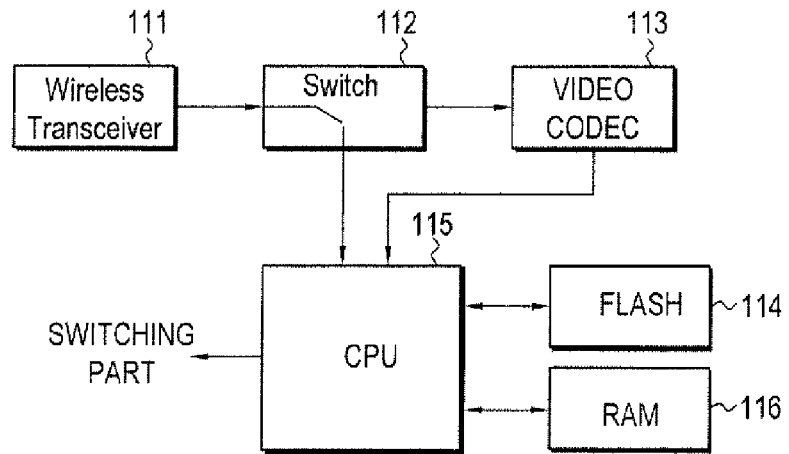
FIG. 4 is a block diagram for showing the wireless module of FIG. 3 in detail.

FIG. 4 is a block diagram for showing the wireless module 110 of FIG. 3 in detail.

The wireless module 110 shown in FIG. 4 has a wireless transceiver 111, a switch 112, a video codec 113, a flash ROM Flash 114, a processor (CPU) 115, and a RAM 116.

The wireless transceiver 111 receives a wireless input signal from the host computer 10, and a signal generated from the touch panel 162 is applied to the host computer 10. In general, the wireless transceiver 111 preferably performs wireless communications according to the 802.11b standard.

If a wireless input signal received from the wireless transceiver 111 is a signal of image data format such as Moving Picture Experts Group (MPEG), the switch 112 applies the signal to the video codec 113, and, if not, applies the signal to the processor (CPU) 115. The video codec 113 decodes video data of MPEG format applied from the switch 112, and applies the decoded video data to the processor 114. The flash ROM 114 stores an operating system for controlling the wireless module and application programs such as programs for decoding video data applied through the switch 112.

The processor 115 controls the overall wireless module 110 with the operating system and application programs provided in the flash ROM 114. The RAM 116 temporarily stores temporary data occurring when the processor 115 controls the wireless module 110, or converts a wireless input signal applied through the switch 112 into a predetermined format with application programs stored in the flash ROM 114 and applies the wireless input signal into the switching part 140. At this time, the wireless module 110 operates regardless of a result of the detection of the docking detector 130. That is, a control signal to be applied to the display panel 160 via the switching part 140 in the wireless module 110 according to a result of the detection of the docking detector 130 is not a consideration of the application programs stored in the flash ROM 114.

Figure 5:
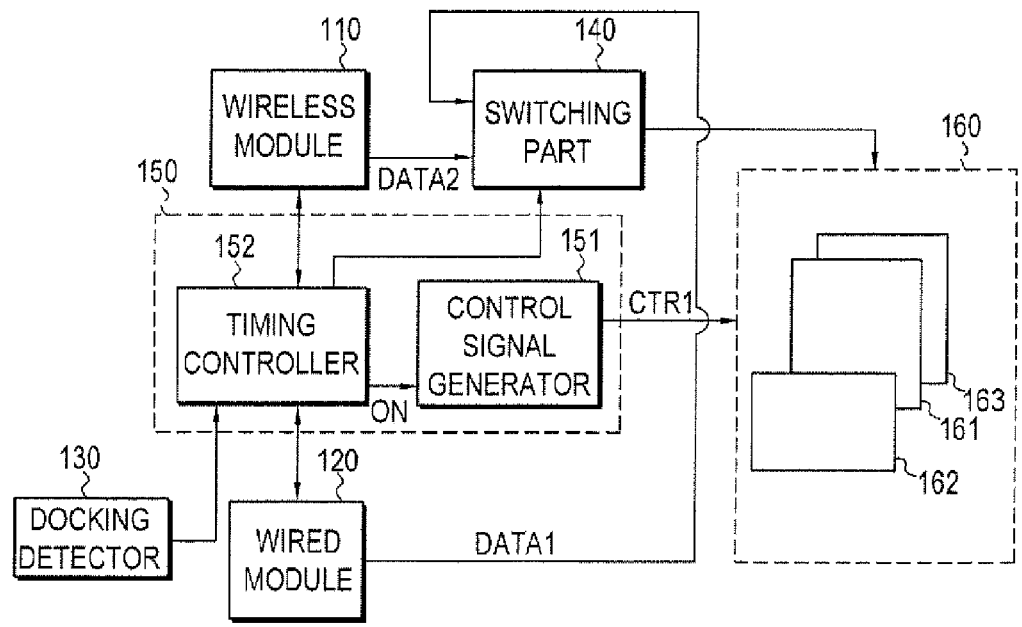
FIG. 5 is a block diagram for showing the display controller of FIG. 3 in detail.

FIG. 5 is a block diagram for showing the display controller 150 of FIG. 3 in detail.

The display controller 150 shown in FIG. 5 has a control signal generator 151 and a timing controller 152.

The control signal generator 151 generates a control signal ctrl for turning the display panel on and off according to a predefined pattern. The control signal ctrl indicates a signal for turning on and off the TFT panel 161, touch panel 162, and backlight panel 163 which are provided for the display panel 160. The control signal ctrl is generated in order of the touch panel 162, TFT panel 161, and backlight panel 163 when the display panel 160 is turned on, and in order of the backlight panel 163, TFT panel 161, and touch panel 162 when the display panel 160 is turned off.

The timing controller 152 controls a time point at which the control signal ctrl is generated from the control signal generator 151. As aforementioned, the control signal ctrl generated from the control signal generator 151 is generated in a different order when turning the display panel 160 on and when turning the display panel 160 off. When the docking station 20 is coupled with the mobile display device 30, the timing controller 152 has the control signal generator 151 generate the control signal ctrl to turn off the backlight panel 163, TFT panel 161, and touch panel 162 in turn in order to stop a video signal applied from the wireless module 110 to the display panel 160.

After the display panel 160 is turned off by the control signal ctrl applied from the control signal generator 151, the timing controller 152 controls the switching part 140 to apply the video signal data1 of the wired module 120 to the display panel 160. Next, the timing controller 152 has the control signal generator 151 generate the control signal ctrl which turns on the display panel 160, to thereby turn on the display panel 160 in order of the touch panel 162, TFT panel 161, and backlight panel 163. Through such steps, the wireless module 110 and the wired module 120 do not have to recognize each other's states.

That is, the conventional wireless module 110 and wired module 120 turns the display panel 160 off, and the view switchovers are performed in a state that the wireless module 110 and wired module 120 each recognize the turn-off of the display panel 160, whereas the present invention does not need the above steps. For example, the wireless module 110 has only to decode a wireless input signal applied from the host computer 10 and output the decoded wireless input signal to the switching part 140, and, when the docking station 20 and the mobile display device 30 are connected, the wired module 120 has also only to decode wired data which is applied, and apply the decoded wired data to the switching part 140. At this time, the timing controller 152 applies an enable signal on to the control signal generator 151 while properly delaying time depending upon response speeds of the wireless module 110 and the wired module 120. The video signal data1 that the wireless module 110 and the wired module 120 output is switched at a suitable time by the display controller 150, so that switching noise does not appear on the display panel 160. Further, since the wireless module 110 and the wired module 120 are independently driven from each other, the implementation of hardware and software becomes simplified as well as error possibility is reduced.

Figure 6A:
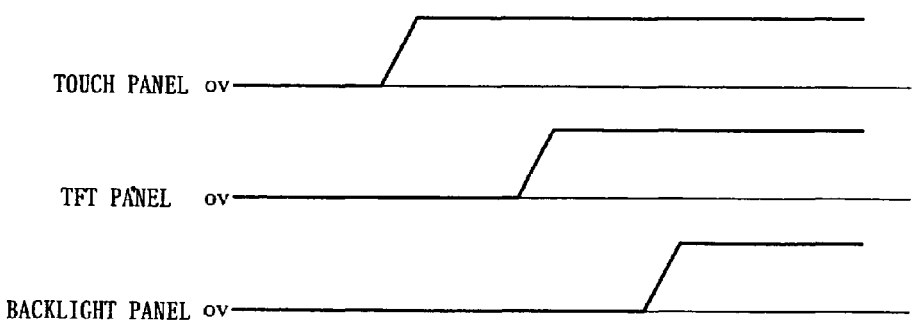
FIG. 6A and FIG. 6B are views for showing waveforms of control signals applied from a control signal generator to a display panel to turn the display panel on and off.
Figure 6B:
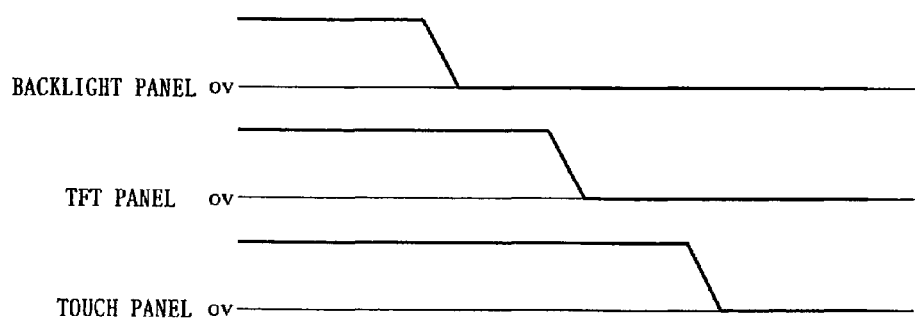

FIG. 6A and FIG. 6B are views for showing patterns of the control signal ctrl applied to the display panel 160 in order for the control signal generator 152 to turn on and off the display panel 160.

First, FIG. 6A is a view for showing patterns of the control signal ctrl for turning the display panel 160 on. As shown in FIG. 6A, the control signal ctrl is applied in order of enabling the touch panel 162, TFT panel 161, and backlight panel 163 in order to turn the display panel 160 on. FIG. 6B is a view for showing patterns of the control signal ctrl for turning the display panel 160 off, which indicates that the control signal is applied in order of disenabling the backlight panel 163, TFT panel 161, and touch panel 162.

Figure 7:
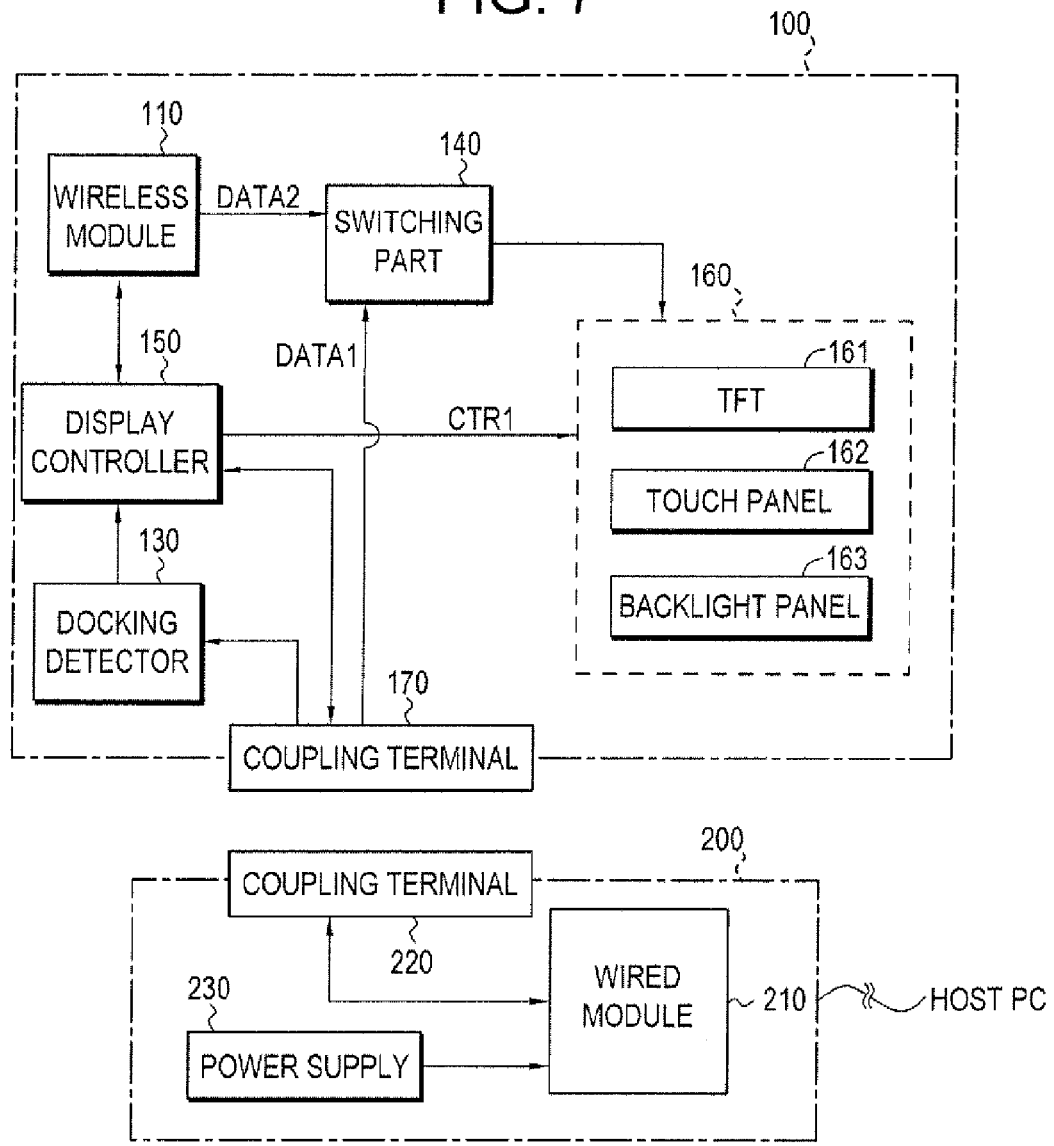
FIG. 7 is a block diagram for showing a mobile display system according to a preferred embodiment of the present invention.

FIG. 7 is a block diagram for showing a mobile display system according to a preferred embodiment of the present invention.

The mobile display system shown in FIG. 7 has the host computer 10 for producing wired and wireless input signals, a docking station 200 provided with a wired module 210 for converting a wired input signal applied from the host computer 10 into a video signal, and a display panel 160 provided with the wireless module 110. Further, the docking station 200 is provided with a power supply 230 for driving the wired module 210. The power supply 230 rectifies an AC voltage and supplies power to the wired module 210, and, at this time, the power supply 230 supplies a certain voltage to the wired module 210 regardless of a coupling state of the display device 30 and the docking station 200.

The same descriptions made from FIG. 3 to FIG. 5 are applied to the display panel 160, display controller 150, docking detector 130, and wireless module 110 of the mobile display system shown in FIG. 7, so any further descriptions of the components of FIG. 7 will be omitted. The present embodiment has the wired module 210 built in the docking station 200, indicating an example that consuming power is reduced in a state that the mobile display device 30 is released. Accordingly, when coupled with the docking station 200, a display device 100 utilizes a pair of coupling terminals 170 and 220 to connect to the wired module 210 built in the docking station 200. Even though not shown in FIG. 7, the coupling terminal 170 has a switch in order for the docking detector 130 to recognize that the coupling terminal 170 is coupled with the coupling terminal 220. The docking station 200 preferably maintains a state that it is coupled all the time with the power supply 230 for driving the wired module 210. Accordingly, the display device 100 with portability emphasized does not generate power consumption by the wired module 210 when the display device 100 is driven by the wireless module 110, so that the display device can be used for longer time.

Figure 8:
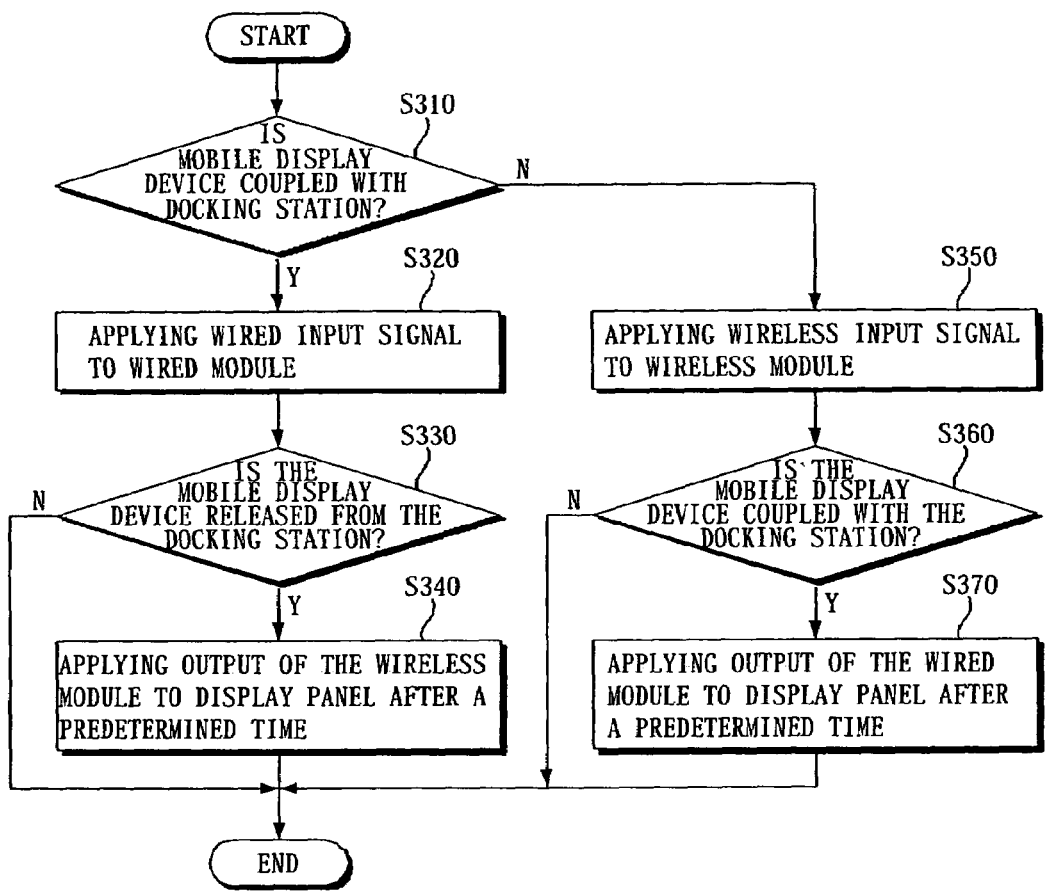
FIG. 8 is a flowchart for showing a method for reproducing a video signal of the mobile display device according to an embodiment of the present invention.

FIG. 8 is a flowchart for showing a method for reproducing a video signal of the mobile display device according to an embodiment of the present invention.

The docking detector 130 detects whether the mobile display device 30 and the docking station 200 are coupled with each other (step of S310). If it is determined that the mobile display device 30 is coupled with the docking station 200, the display controller 150 applies a control signal ctrl to the display panel 160 to turn on the display panel 160, and controls the switching part 140 to apply a wired input signal to the wired module 210 (step of S320). Next, the docking detector 130 detects whether the mobile display device 30 is released from the docking station 200 during the operation of reproducing a video signal in response to the wired input signal (step of S330). As a result of the detection, if the mobile display device 30 is released from the docking station 200, the display controller 150 controls the switching part 140 to apply a video signal output from the wireless module 110 to the display panel 160 (step of S340). At this time, in consideration of the time for the wireless module 110 to receive a wireless input signal from the host computer 10 and reproduce it as a video signal, the display controller 150 cuts off after a predetermined time the wired input signal applied from the wired module 210 to the display panel 160 through the switching part 140. Accordingly, when the mobile display device 30 is released from the docking station 200, a view is not disconnected and noise dose not occur during the predetermined time.

Meanwhile, as a result of the detection of the docking detector 130, if the mobile display device 30 is released from the docking station 200 (step of S310), the display controller 150 controls the switching part 140 to apply a video signal output from the wireless module 110 to the display panel 160 (step of S350).

Next, the docking detector 130 detects whether the mobile display device 30 is coupled with the docking station 200 during the operation of receiving a wireless input signal and reproducing it as a video signal (step of S360). As a result of the detection, if the mobile display device 30 is coupled with the docking station 200, the display controller 150 controls the switching part 140 to apply a video signal output from the wired module 210 to the display panel 160 (step of S370). At this time, in consideration of the time for the wired module 210 to receive a wired input signal from the host computer 10 and decode the signal, the switching part 140 does not immediately cut off the video signal applied from the wireless module 110 to the display panel 160. That is, the display controller 150 takes into consideration the time to convert from the wireless module 110 to the wired module 210 in advance, and performs a control function such that the video signal output from the wired module 210 is applied to the display panel 160. Accordingly, when the mobile display device 30 is released from the docking station 30, a view is not disconnected and the noise does not occur during the predetermined time.

As stated above, since the wireless module and the wired module do not have to recognize each other's states, the present invention simplifies in design the hardware and software of the wireless module and the wired module, and reduces mutual reliability to decrease errors occurring during operations. Further, due to the use of the wired module built in the docking station, the present invention can use the display device for a longer time, and can properly control the switching time between the wireless module and the wired module so that switching noise does not appear.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A mobile display device for communicating with a host computer in wired and wireless manners depending upon whether the mobile display device is coupled with a docking station that is supplied with one of a wired input signal and a wireless input signal from the host computer, comprising:
   a wired module that receives the one of the wired input signal and the wireless input signal, applied from the docking station and converting the one of the wired input signal and the wireless input signal into a first video signal when the mobile display device is coupled with the docking station;
   a wireless module that converts the one of the wired input signal and the wireless input signal, applied from the host computer into a second video signal when the mobile display device is released from the docking station;
   a display panel that reproduces the first video signal and the second video signal; and
   a display controller that converts, within a predetermined time margin, the first and second video signals applied to the display panel from the wired module and the wireless module, depending upon whether the mobile display device is coupled with the docking station, and applying to the display panel a control signal for turning on and off images reproduced from the display panel at the time of the conversions.

2. The mobile display device as claimed in claim 1, wherein the display controller comprises:
   a control signal generator that generates in predefined patterns the control signal for turning the mobile display device on and off; and
   a timing controller that controls the control signal generator to apply the control signal to the mobile display device, depending upon whether the docking station is coupled to the mobile display device, and turning the control signal generator on and off considering a time point at which either of the first and second video signals is applied to the display panel.

3. The mobile display device as claimed in claim 1, wherein the mobile display device further comprises a touch panel for producing a signal corresponding to external pressure.

4. The mobile display device as claimed in claim 3, wherein the wireless module applies the signal of the touch panel to the host computer.

5. A mobile display system, comprising:
   a host computer that enables wired and wireless communications;
   a docking station provided with a wired module for receiving one of a wired input signal and a wireless input signal from the host computer and converting the one of the wired input signal and the wireless input signal into a first video signal; and
   a mobile display device that converts, within a predetermined time margin, said one of the wired input signal and the wireless input signal applied from the host computer into a second video signal, and reproducing either of the first and second video signal depending upon whether the mobile display device is coupled with the docking station,
   wherein the mobile display device comprises:
   a display panel that reproduces the first and second video signals;
   coupling connectors that couple the mobile display device with the docking station;

a wireless module that converts said one of the wired input signal and the wireless input signal into the second video signal;

a switching part that selects and applies either of the first and second video signals to the display panel; and a display controller that controls the switching part depending upon the coupled state of the coupling connectors, and applies either of the first and second video signals to the display panel.

6. The mobile display system as claimed in claim 5, wherein the docking station further includes a power supply for rectifying and supplying a normal voltage to the wired module.

7. The mobile display system as claimed in claim 5, wherein the display controller includes:

a control signal generator that generates in predefined patterns a control signal for turning the display panel on and off; and a timing controller that controls the control signal generator to apply the control signal to the display panel depending upon the coupled state of the coupling connectors, and turning the control signal generator on and off in consideration of a time point at which either of the first and second video signals are applied to the display panel.

8. An image signal reproducing method of a mobile display device for communicating with a host computer in wired and wireless manners depending upon whether the mobile display device is coupled with a docking station supplied with one of a wired input signal and a wireless input signal from the host computer, the method comprising the steps of:

selectively performing one of a wired communication and a wireless communication depending on whether the mobile display device is coupled with the docking station; and converting the wired communication to the wireless communication, and vice versa, within a predetermined time margin, according to a docking state of the mobile display device to the docking station, wherein, when the wired communication is converted to the wireless communication, and vice versa, a video signal based on one of a wired communication state and wireless communication state prior to said conversion is received and reproduced for a predetermined time.

* * * * *